UNITED STATES PATENT OFFICE.

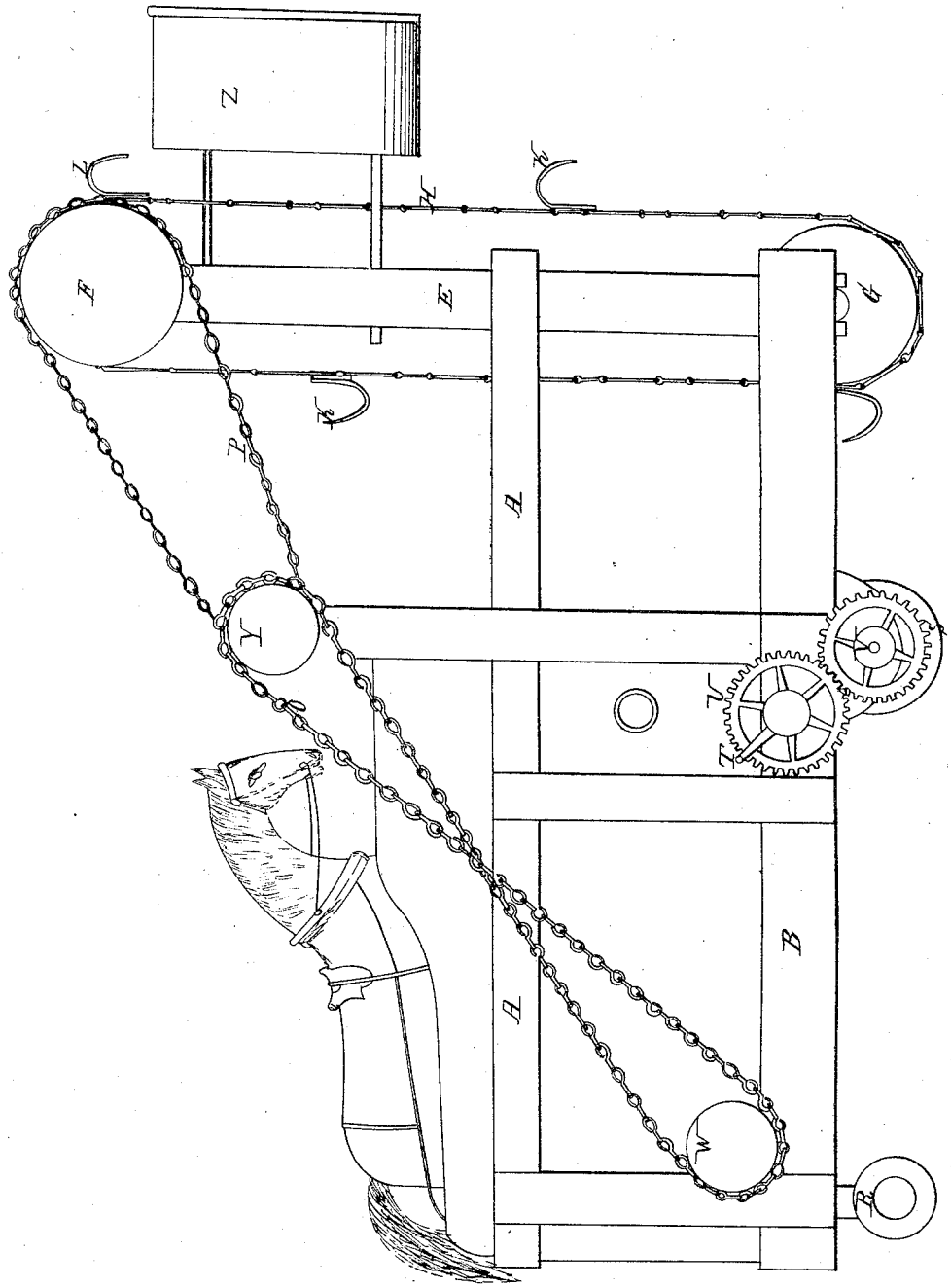

STEPHEN T. BISHOP AND ANDREW STEVELEY, OF FOND DU LAC, WIS.

IMPROVEMENT IN HORSE-POWER ELEVATORS AND EXCAVATORS.

Specification forming part of Letters Patent No. 45,966, dated January 24, 1865.

*To all whom it may concern:*

Be it known that we, STEPHEN T. BISHOP and ANDREW STEVELEY, of Fond du Lac, in the county of Fond du Lac and State of Wisconsin, have invented a new and useful Improvement in Horse-Power Excavators and Elevators; and we do hereby declare that the following is a full and exact description thereof, reference being had to the accompanying drawings, and to the letters of reference marked thereon.

Our invention consists, first, in so constructing and arranging a horse-power excavator and elevator as to render the machine movable with the horse upon the same; and, second, in a peculiar arrangement of gear-wheels, in connection with traveling or ground wheels, for moving such machine with the horse upon it. Horse-powers are usually fixed or made stationary before the horse is set to work, and we are not aware that any attempt has been made to render a horse-power movable while at work or with the horse upon it. In the construction of a combined horse-power and excavator we have found it very important to render the machine movable while the horse is upon the machine.

The accompanying drawing represents a side elevation of our machine.

More complete drawings and a full description of our machine are given in other applications for patent filed in the Patent Office simultaneous'y with this application, in which we confine our claims to the mobility of the whole machine with the horse upon the same.

In the construction of our improvements herein claimed the horse-power proper may be of the usual form of endless apron, with the horse treading upon such apron, as represented in the accompanying drawing, Fig. 1. The front part of the horse-power frame may be taller than usual, and carry pulleys for the chains intended to drive the excavator and elevator. Upon the same frame with the horse-power may be arranged the excavating-machine.

Two large pulleys, F and G, carry an endless chain, H, which is provided with buckets K and hooks L. The frame E is made adjustable upon the horizontal pieces A and B of the frame, in order to raise and lower the chain H at pleasure. This adjustment is effected by means of three ratchet-wheels worked by the crank M, one of these wheels being seen at N and the other two (on the same shaft) working into notches or notched bars on the upright frame E. Motion is communicated to the chain H and buckets by means of chains O and P.

As the work of excavation and elevation of the earth proceeds, the whole machine is moved at pleasure by the operator, either pressed forward gently as the digging proceeds, or withdrawn if necessary. For the purpose of rendering the whole machine thus movable, we have arranged upon the side of the frame two gear-wheels, U and V. The upper wheel, U, is provided with a crank, T, by means of which the operator has complete control of the wheels. The lower wheel, V, is fixed upon the end of an axle common to a pair of wheels, S, which support the front part of the machine. Another pair of wheels, R, support the rear end of the machine. The axle to these wheels R is pivoted at its center, like the front axle of a wagon, while the axle to the wheels S is attached firmly at both ends to the frame of the machine. By this arrangement the machine may be moved and guided as circumstances require without removing the horse from the machine.

Of course a machine may be constructed for working two or more horses, and other details in the machine may be varied, without departing from our invention.

Having thus described our invention, what we claim, and desire to secure by Letters Patent of the United States, is—

1. So constructing and arranging a horse-power excavator and elevator as to render the machine movable with the horse upon the same, substantially in the manner and for the purposes set forth.

2. The above-described arrangement of the wheels U and V, in combination with the two sets of wheels R and S, substantially as specified.

STEPHEN T. BISHOP.
ANDREW STEVELEY.

Witnesses to the signature of Stephen T. Bishop:
   DANIEL BREED,
   G. BREED.

Witnesses to the signature of Andrew Steveley:
   M. F. KELLOGG,
   S. M. IVES.